United States Patent [19]

Scarnera et al.

[11] Patent Number: 4,732,122
[45] Date of Patent: Mar. 22, 1988

[54] STARTING FUEL SUPPLY SYSTEM FOR AN INTERNAL COMBUSTION ENGINE, COMPRISING AN ELECTRONIC INJECTION SYSTEM

[75] Inventors: Michele Scarnera, Monzuno; Carlo Conticelli, Bolonga, both of Italy

[73] Assignee: Weber S.p.A., Turin, Italy

[21] Appl. No.: 870,430

[22] Filed: Jun. 4, 1986

[30] Foreign Application Priority Data

Jun. 4, 1985 [IT] Italy ................. 67511 A/85

[51] Int. Cl.⁴ .................................. F02M 51/00
[52] U.S. Cl. ...................... 123/179 L; 123/478; 123/491
[58] Field of Search ............ 123/179 G, 179 L, 478, 123/480, 491; 364/431.1

[56] References Cited

U.S. PATENT DOCUMENTS

| | | | |
|---|---|---|---|
| 3,923,031 | 12/1975 | Keranen | 123/179 L |
| 4,418,674 | 12/1983 | Hasegawa et al. | 123/179 L X |
| 4,495,927 | 1/1985 | Yamato | 123/179 L X |
| 4,498,444 | 2/1985 | Tabuchi et al. | 123/179 L |
| 4,508,083 | 4/1985 | Hasegawa et al. | 123/179 L X |

Primary Examiner—Willis R. Wolfe, Jr.
Attorney, Agent, or Firm—Gifford, Groh, VanOphem, Sheridan, Sprinkler and Dolgorukov

[57] ABSTRACT

A starting fuel supply system for an internal combustion engine, comprising an electronic injection system, and processing means which, prior to stroke identification of the engine, cause fuel to be supplied to more than one injector, including the injector relative to the cylinder first reaching the ignition point subsequent to such identification, and which has already completed the induction stroke, thus enabling substantially total intake of the fuel injected into the cylinder.

9 Claims, 13 Drawing Figures

Fig. 5

STARTING FUEL SUPPLY SYSTEM FOR AN INTERNAL COMBUSTION ENGINE, COMPRISING AN ELECTRONIC INJECTION SYSTEM

BACKGROUND OF THE INVENTION

The present invention relates to a starting fuel supply system for an internal combustion engine, comprising an electronic injection system, in particular, a sequential, timed electronic injection system.

Electronic injection systems on internal combustion engines are known to present an electronic control system which, depending on the signals received from various sensors (mainly engine speed/stroke and intake air pressure/temperature sensors), determines, for example, air density inside the manifold and engine speed, and calculates, via interpolation on respective memorised maps, the stroke and timing for injecting fuel into the injectors, as well as the spark lead. Such a sequential, timed electronic injection system therefore employs a given number of angular references on the drive and distributor shafts, for enabling the control system to determine the stroke (induction, compression, expansion, exhaust) of each cylinder. Each half revolution of the engine, the control system is therefore able to open the specific injector relative to the cylinder performing the required stroke. The engine strokes, however, must be identified by the control system within the shortest possible time after starting, for enabling correct fuel supply as soon as the engine is started up.

For fuel to be supplied correctly, i;e. full intake by the cylinder during the induction stroke, the exact stroke of each cylinder must be accurately determined for ensuring supply to the first cylinder in a position to complete a full induction and compression stroke. Such supply precision, however, conflicts with the need for the control system to supply the engine quickly and efficiently under unfavourable and, at times, even critical starting condittions. In fact, with the engine set at the worst possible starting angle, full identification of the engine strokes may mean waiting for the engine to turn through 820°, i.e. over two revolutions, before the first effective explosion is produced.

SUMMARY OF THE INVENTION

The aim of the present invention is to provide a starting fuel supply system for an internal combustion engine, designed to overcome the aforementioned drawbacks, i.e. a system enabling fast, efficient fuel supply to the cylinders, so as to minimize the time lapse between identification of the engine strokes and production of the first effective explosion, and thereby provide for optimum startup of the engine.

Further aims and advantages of the system according to the present invention will be dealt with in the following description.

With this aim in view, according to the present invention, there is provided a starting fuel supply system for an internal combustion engine, comprising an electronic injection system, characterized by the fact that the said system comprises processing means which, prior to stroke identification of the said engine, cause fuel to be supplied to more than one injector, including the injector relative to the cylinder first reaching the ignition point subsequent to such identification, and which has already completed the induction stroke, thus enabling substantially total intake of the fuel injected into the said cylinder.

BRIEF DESCRIPTION OF THE DRAWINGS

One embodiment of the present invention will now be described, by way of a non-limiting example, with reference to the accompanying drawings, in which:

FIGS. 5a–i show, schematically, a number of signals on the starting fuel supply system according to the present invention.

DETAILED DESCRIPTION OF THE INVENTION

Figure 1:
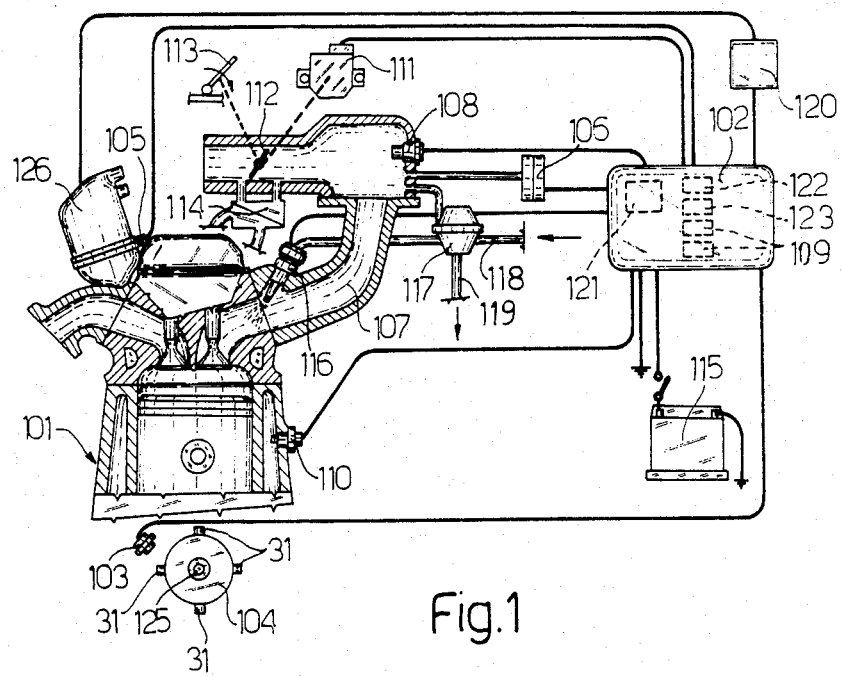
FIG. 1 shows a schematic view of an electronic injection system for an internal combustion engine with a starting fuel supply system according to the present invention.

FIG. 1 shows a schematic view of an electronic injection system for an internal combustion engine 101, conveniently a four-cylinder engine, illustrated partially in cross section. The said system comprises an electronic control system 102 comprising, in substantially known manner, a microprocessor 121 and registers in which are memorized maps relative to various operating conditions of engine 101. The said control system 102 also comprises a counter 122, an updatable memory register 123 and other memory registers 109. The said control system 102 receives signals from:

- a sensor 103 for detecting the speed of engine 101 and located opposite a pulley 104 on drive shaft 125;
- a sensor 105 for detecting the stroke of engine 101 and located inside a distributor 126 as detailed later on;
- a sensor 106 for detecting the absolute pressure inside induction manifold 107 on engine 101;
- a sensor 108 for detecting the air temperature inside manifold 107;
- a sensor 110 for detecting the water temperature inside the cooling jacket on engine 101.
- a sensor 111, substantially consisting of a potentiometer, for detecting the setting of a throttle valve 112 located inside induction manifold 107 and controlled by accelerator pedal 113; parallel with the said throttle valve 112, there is provided an additional air intake valve 114.

The said electronic control system 102 is connected to an electrical supply battery 115 and grounded, and, depending on the signals received from the aforementioned sensors, engine speed and air density are employed for determining fuel supply according to the required mixture strength. The said control system 102 therefore controls the opening time of electroinjectors 116 located inside manifold 107 next to the intake valve of each respective cylinder, so as to control the amount of fuel supplied to the various cylinders on engine 101, and also controls injection timing for commencing fuel supply according to the strokes (induction, compression, expansion, exhaust) of engine 101. Each electroinjector 116 is supplied with fuel via a pressure regulator 117 sensitive to the pressure inside induction manifold 107 and having a fuel intake pipe 118 from a pump (not shown) and a return pipe 119 to a tank (not shown).

Electronic control system 102 is also connected to an ignition pulse control unit 120.

Figure 2:
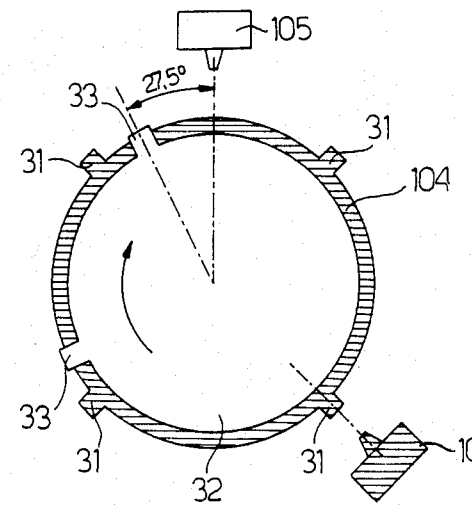
FIG. 2 shows an indicative schematic view of a number of component elements on the FIG. 1 system.
Figure 5:
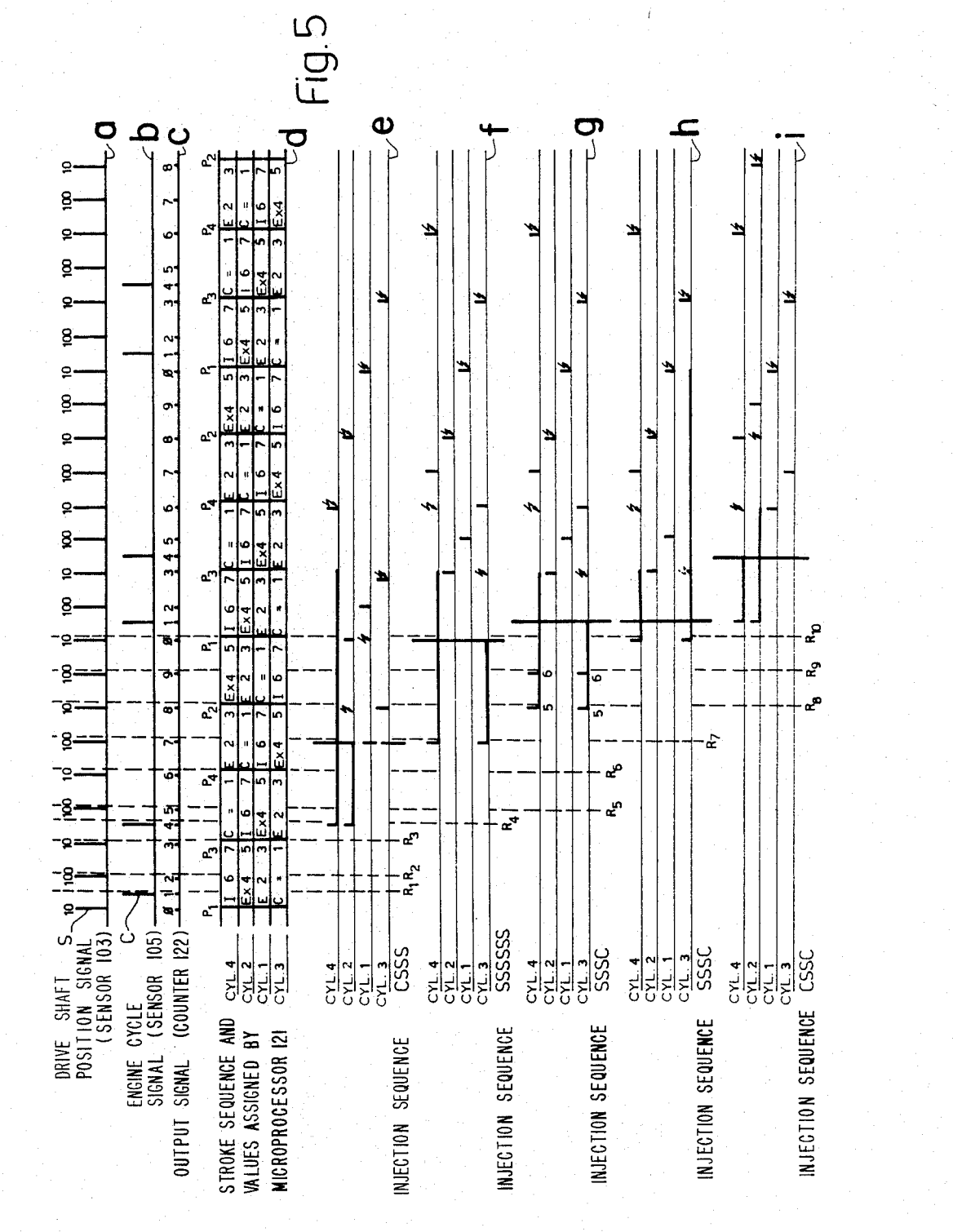

FIG. 2 shows a detail of the system for identifying the strokes of engine 101, said system, in the present specific example, being as described in the Italian Patent Application entitled "Internal combustion engine stroke identification system" filed on the same date by the present Applicant and the content of which is herein incorporated, as required, by way of reference. As shown in FIG. 2 pulley 104 presents four projecting teeth 31 equally spaced at 90° intervals, sensor 103 being arranged facing the passage of said teeth 31 and at such an angle as to detect passage of the same at +10° and +100° respectively in relation to the top dead centre of each cylinder. The sequence of signals (S) supplied by the said sensor 103 during rotation of drive shaft 125 is shown in FIG. 5 and designated $a$. Also as shown in FIG. 2, sensor 105 is arranged facing a disc 32 secured angularly to the shaft of distributor 126 and having two projecting teeth 33 spaced 90° apart. In more detail, the said sensor 105 is located in the distributor portion relative to cylinder 3 and at such an angle that, when a tooth 31 is arranged facing speed sensor 103, the first tooth 33 on disc 32 lags by 27.5° in relation to the axis of sensor 105. FIG. 5 shows the sequence of signals (C) supplied by sensor 105, designated $b$, which, for each complete cycle of engine 101, presents a first signal lagging by 55° in relation to the foregoing signal from sensor 103, and, in the example shown, leading by 135° in relation to the top dead centre of cylinder 3 (indicated by $P_3$ in FIG. 5$d$ in which $P_1$, $P_4$ and $P_2$ indicate the top dead centres of the other cylinders 1, 4 and 2).

The second signal supplied by sensor 105, when the second tooth 33 passes in front of it, leads by 135° in relation to the top dead centre ($P_4$) of cylinder 4, and lags by 180° in relation to the first signal from sensor 105, by virtue of each full turn of disc 32 corresponding to two turns of drive shaft 125 and, consequently, of pulley 104.

FIG. 5, at $d$, shows, one on top of the other for cylinders 4, 2, 1 and 3 respectively, the stroke sequence of each cylinder as related to the angle sequence of the signals from sensor 103 shown at $a$ FIG. 5. The letters I, C, E or Ex in each box indicate the induction, compression, expansion or exhaust stroke respectively of each cylinder.

Figure 3:
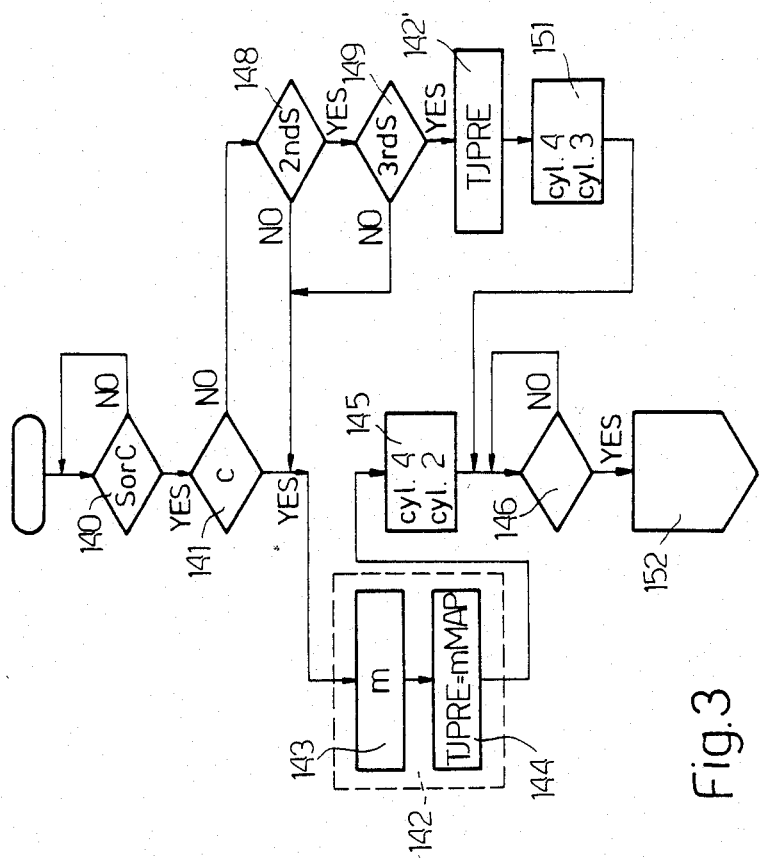
FIG. 3 shows an operating block diagram of the starting fuel supply system according to the present invention.
Figure 4:
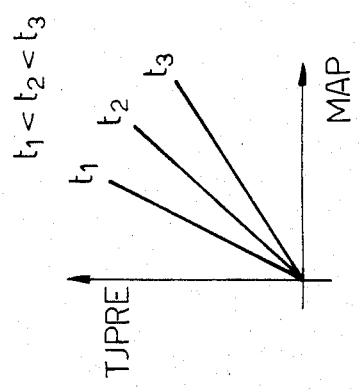
FIG. 4 shows an operation graph relative to a number of blocks in the FIG. 3 diagram.

Operation of the fuel supply system for starting engine 101, according to the present invention, will now be described with reference to FIG. 3. Via block 140, microprocessor 121 detects an incoming signal from sensor 103 or 105 (shown in FIG. 5 at $a$ or $b$, respectively). Upon receiving one of the said signals, block 140 goes on to block 141 which determines whether or not the incoming signal is from sensor 105. If it is, block 141 goes on to block 142 (shown by the dotted line) which performs a simplified calculation of supply time to the injectors, preliminary to stroke identification of engine 101. Operation of the said block 142 is shown in FIG. 4, which shows a graph of the said preliminary injection time (TJPRE) in relation to the absolute pressure in induction manifold 107 (MAP), the lines on the said graph becoming increasingly steeper as the temperature of the cooling water on engine 101 decreases. As a function of the actual water temperature detected by sensor 110, a first block 143 determines, from a memory register containing the various angle coefficients (m) of the lines as a function of various water temperatures, the present coefficient (m), and then moves on to block 144 which calculates preliminary injection time (TJPRE) by multiplying the coefficient determined by block 143 (m) by the pressure (MAP) detected by sensor 106. Block 142 then goes on to block 145 which controls fuel supply to injectors 116 relative to cylinders 4 and 2 for the said preliminary injection time (TJPRE) determined by block 142, and also disables fuel supply to the same injectors 116 of the said cylinders 4 and 2 until given conditions are established, subsequent to stroke identification of engine 101, as explained in more detail later on. Block 145 then goes on to block 146 which determines whether or not the strokes of engine 101 have been identified, by means of signals from sensors 103 and 105 received in one of a number of prearranged combinations.

If, on the other hand, the signal detected by block 140 is found to be, not from sensor 105, but from sensor 103, block 141 goes on to block 148 which determines whether the next incoming signal from the sensors is again from sensor 103. If it is not, block 148 goes on to block 142.

If it is, block 148 goes on to block 149 which determines whether the next signal (i.e. the third in a row) received from the sensors is again from sensor 103. If it is not, block 149 goes on to block 142. If it is, block 149 goes on to block 142', which operates in the same way as block 142 for calculating preliminary injection time, and which goes on to block 151 which controls fuel supply (for the calculated time TJPRE) to injectors 116 relative to cylinders 4 and 3, and also disables further fuel supply to the said injectors until given conditions are established, subsequent to stroke identification of engine 101, as in block 145. Block 151 goes on to block 146 which, as already stated, only controls performance of the main injection routine, via block 152, upon identification of the stroke of engine 101, which, in the case of the aforementioned Patent Application filed by the present Applicant, amounts to receiving one of a number of prearranged signal sequences from sensors 103 and 105. The said sequences are listed in the following Table 1 in which the letter S indicates the signals from sensor 103, and C the signals from sensor 105. The number from 0 to 9 beside each sequence is the number of which is preset counter 122, the output sequence of which is shown in FIG. 5 and designated $c$. The said counter 122 is moved forward one unit for each incoming signal from sensor 103 or 105, and has a maximum capacity ranging from 0 to 9. When the maximum count (9) is reached, the next signal from sensor 103 sends the counter back to 0, in that the same signal cycle from sensors 103 and 105 and the same stroke cycle of engine 101 are repeated continually. The output from 0 to 9 of counter 122 thus indicates the strokes of engine 101, by informing the output switch, as shown in FIG. 5, of the intermediate or final status of each specific stroke of each cylinder. For example, when the output of counter 122 switches to 7, this means the cylinders on engine 101 are roughly halfway through: expansion (cylinder 4), compression (cylinder 2), induction (cylinder 1) and exhaust (cylinder 3). In more detail, by means of block 152, microprocessor 121 receiving the output of counter 122 assigns, to each said output value, one of the numbers shown in FIG. 5 at $d$, relative to the various cylinders on engine 101 and indicating the stroke status of the same. For example, with an output of 8 on counter 122, microprocessor 121 assigns a 3 to cylinder 4, a 1 to cylinder 2, a 7 to cylinder 1 and a 5 to cylinder 3, thus indicating that the said four cylinders are at end of the expansion, compression, induction and exhaust stroke respectively. In like manner, fuel supply to injectors 116 and ignition by unit 120, as determined by respective maps stored in control unit 102, are performed at the required cylinder strokes, when the said numbers from 0 to 7 indicating the specific stroke status of each cylinder are supplied. Table 1 below shows, beside each memorized sequence identifying the strokes of engine 101, the first effective ignition point, with reference to FIG. 5 at d.

TABLE 1

| C S S S | 7 | $P_2$ |
|---|---|---|
| S S S S S S | 0 | $P_3$ |
| S S S C | 1 | $P_3$-$P_4$ |
| C S S C | 4 | $P_4$ |

As shown in the above Table, in the event of sequence SSSC being identified, the first effective ignition point, i.e. relative to a cylinder which has actually sucked in the amount of fuel injected, could be $P_3$ or $P_4$, depending on the starting angle of the engine, as described in more detail later on, with reference to the sequence designated g and h in FIG. 5.

Subsequent to stroke identification of engine 101, block 152 provides for sequential ignition pulse supply via block 120, distribution to the various cylinders being performed via distributor 126, as well as for controlling sequential, timed fuel supply to the four electroinjectors 116 for the periodic supply cycles in the routine memorised and controlled by microprocessor 121. In more detail, subsequent to stroke identification of engine 101, fuel is supplied starting with the cylinder in stroke 6 on counter 122 (i.e. the cylinder roughly halfway through the induction stroke) and then progressively to those which, for each increase in the output of counter 122, present stroke figures gradually decreasing down to the steady state figure provided for in the routine. It should be noted that the injectors may be supplied, and fuel fed into the induction manifold 107 in the proximity of the intake valve on the respective cylinder, considerably in advance of the valve opening stage and mixture intake into the cylinder. For synchronizing preliminary supply of injectors 116 and steady state supply, supply to injectors 116 having received the said preliminary supply, subsequent to stroke identification by block 145 or 151, is only enabled to block 152, subsequent to stroke identification of engine 101, upon microprocessor 121 ascertaining the completion of an effective induction stroke and substantially full intake of the preliminary fuel injected into the cylinders.

Which pair of electroinjectors 116 is supplied depends on the starting angle of the engine. As shown in FIG. 5 at e in the case of start-up commencing after the first tooth 33 moves past sensor 105 (angle $R_1$), the first signal picked up by block 140 (FIG. 3) is an S signal from sensor 103. Consequently, block 141 goes on to block 148 which, as the next signal is again from sensor 103, goes on to block 149. As the next signal is a C signal from sensor 105, block 149 goes on to block 142 and, from there, to block 145 which controls fuel supply to injectors 116 of cylinders 4 and 2 for the assessed preliminary injection time (TJPRE). Block 145 goes on to block 146 which, for the said starting angle $R_1$, detects a recognized stroke identification sequence of CSSSS, which, as shown in Table 1, amounts to counter 122 being preset to output 7. Block 146 then goes on to block 152 which, as already stated, only enables injector 116 relative to cylinder 4 upon completion of the induction stroke, whereas injector 116 relative to cylinder 2 is enabled immediately, in that, cylinder 2 has already completed the induction stroke, thus enabling effective preliminary injection. (The thick black lines in FIG. 5 indicate the periods in which the said prefed injectors are disabled). In the specific case shown, in which steady state fuel is supplied at stroke reference 1 (i.e. at the end of the compression stroke), supply commences with injector 116 relative to cylinder 1 at stroke reference 6, followed by injector 116 relative to cylinder 3 at stroke reference 5, (no supply at stroke reference 4 to disabled injector 116 relative to cylinder 4), injector 116 relative to cylinder 2 at stroke reference 3, and, finally, injector 116 relative to cylinder 1 at stroke reference 2. From cylinder 3 onwards, all injectors 116 are supplied sequentially at steady state stroke reference 1.

Block 152 then enables supply of the first ignition pulse to cylinder 2, which is the first, subsequent to stroke identification, to reach top dead centre ($P_2$) and is one of the two cylinders into which preliminary fuel has been injected. Ignition pulses are then sent progressively to the other cylinders in the top dead centre position, so as to progressively ignite, in cylinders 1, 3, 4, 2, etc . . . the air-fuel mixture injected respectively at: stroke reference 6, stroke reference 5, preliminary to stroke identification (hence, no waste of the fuel injected simultaneously with that of cylinder 2 providing the first effective ignition), stroke reference 3, etc.

If, on the other hand, start-up commences after tooth 31 moves past sensor 103 (angle R), signal identification is performed by block 141 and block 148 which goes on to block 142 and block 145 which, as already explained, controls fuel supply to electroinjectors 116 relative to cylinders 4 and 2. Block 145 goes on to block 146 and, from there, to block 152, which operate as already described. If, on the other hand, identification commences at angle $R_3$, direct recognition of signal C by block 141 results in direct activation of blocks 142 and 145 for supplying fuel to the cylinder 4 and 2 injectors and subsequent operation of blocks 146 and 152 as described.

As shown in FIG. 5 at f, should start-up commence at angle $R_4$, three S signals in a row are recognized by blocks 141, 148 and 149 (FIG. 3), so that, via block 142', block 149 goes on to block 151 which controls fuel supply to electroinjectors 116 relative to cylinders 4 and 3 for the injection time TJPRE determined by block 142', after which, block 151 goes on to block 146. As, in this startup condition, stroke identification is effected by means of a sequence of six S signals from sensor 103, block 146, which detects stroke identification resulting in counter 122 being preset to output 0, enables the routines of block 152 and, as already described with reference to sequence e in FIG. 5, the first ignition pulse is enabled at point $P_3$ for cylinder 3 supplied with fuel preliminary to stroke identification. The various ignition pulses for cylinder sequence 4, 2, 1, 3, etc. are then supplied progressively, in sequential and timed manner (via distributor 126). Injector 116 relative to cylinder 3 is therefore enabled immediately, upon stroke identification, whereas injector 116 relative to cylinder 4 is enabled upon completion of the induction stroke. As no enabled injector 116 presents stroke reference 6 subsequent to stroke identification of engine 101, the first injector 116 to be supplied is the one relative to cylinder 2, which is supplied at stroke reference 5 and followed by injector 116 relative to cylinder 1 at stroke reference 4, injector 116 relative to cylinder 3 at stroke reference 3, injector 116 relative to cylinder 4 (now enabled) at stroke reference 2, and, finally, all injectors 116 progressively presenting steady state stroke reference 1.

As shown in FIG. 5 at g, if start-up commences at angle $R_5$ or $R_6$, the sequence of three S signals supplied by sensor 103, and picked up by blocks 141, 148 and 149, again controls, via block 151, fuel supply to electroinjectors 116 of cylinders 4 and 3, whereas stroke identification of engine 101 is effected upon identification of the SSSC signal sequence presetting counter 122 to output 1. Block 151 therefore goes on to block 146 which, subsequent to identification of the said signal sequence and, consequently also, of the strokes of engine 101, first enables, via block 152, ignition of cylinder 3 into which a preliminary fuel supply has been fed, and then sends out a sequential, timed control for supplying electroinjectors 116 and igniting the cylinders, as already described with reference to sequence f in FIG. 5. If, on the other hand, start-up commences at angle $R_7$ (at h in FIG. 5), a sequence of three consecutive signals is again supplied by sensor 103 and detected by blocks 141, 148 and 149, so that supply is again effected, via block 151, to electroinjectors 116 relative to cylinders 4 and 3. In this case, the first effective cylinder in terms of ignition, and in a positive to complete a full induction cycle, is cylinder 4, in that cylinder 3 is supplied with fuel towards the end of the induction stroke. In this case, therefore, upon reception of signal C, resulting in a stroke identification signal sequence of SSSC, which presets counter 122 to output 1, block 146 goes on to block 152 which first enables ignition point $P_3$. As this is ineffective, however, in that fuel has not been sucked up by cylinder 3, thus makin $P_4$ the first effective ignition point, the various sequential ignition points are enabled as already described.

Injector 116 relative to cylinder 4 only remains disabled up to point $P_3$, whereas injector 116 relative to cylinder 3 remains disabled until completion of the induction stroke subsequent to identification (i.e. up to point $P_1$).

Subsequent to stroke identification of engine 101, the first cylinder to reach stroke reference 6 is cylinder 4, the respective injector 116 of which, however, is not supplied, by virtue of it still being disabled by preliminary injection. The first injector 116 to be supplied is therefore the one relative to cylinder 2 at stroke reference 5, followed by injector 116 relative to cylinder 1 at stroke reference 4. Injector 116 relative to cylinder 3 is not supplied at stroke reference 3 in that it is still disabled. The next injector 116 supplied at stroke reference 2 is therefore the one relative to cylinder 3, after which, fuel is supplied progressively to the various injectors 116 relative to cylinders at steady state stroke reference 1.

In the case of start-up commencing at one of angles $R_8$, $R_9$ or $R_{10}$, as shown at i in FIG. 5, as three consecutive signals are not received from sensor 103, upon reception of signal C supplied by sensor 105 and detected, for the said three angles, by blocks 149, 148 and 141 respectively, the said blocks go on to block 142 and from there, to block 145 which controls fuel supply to electroinjectors 116 relative to cylinders 4 and 2. Block 145 then goes on to block 146 which detects identification of the CSSC sequence resulting in counter 122 being present to output 4. Subsequent to such stroke identification of engine 101, a sequential, timed control is issued, via block 152, for supplying electroinjectors 116 and igniting the cylinders, as already described, and with the first ignition point $P_4$ supplied to cylinder 4 injected with fuel preliminary to stroke identification.

The advantages of the starting fuel supply system for an internal combustion engine, comprising an electronic injection system, according to the present invention, will be clear from the foregoing description. In particular, it provides for considerably accelerating start-up of the engine, by virtue of enabling an effective ignition pulse to be supplied to the first cylinder reaching the top dead centre position subsequent to stroke identification of the engine, which cylinder has been fed with a preliminary fuel supply which may be sucked up almost entirely in the respective induction stroke. On the starting fuel supply system according to the present invention, fuel is supplied to a pair of electroinjectors, depending on the reference signals received from sensors 103 and 105, and, therefore, on the starting angle of the engine; one of the said two electroinjectors undoubtedly being relative to the cylinder first reaching the top dead center position enabling effective ignition subsequent to stroke identification, and the fuel injected into the other cylinder being preserved for intake during a subsequent stroke, when the respective intake valve is opened. As stated in the foregoing description, upon reception of a signal from sensor 105, the first effective cylinder may be cylinder (sequence e in FIG. 5) or cylinder 4 (sequence h in FIG. 5), so that fuel is supplied to electroinjectors 116 relative to cylinders 2 and 4. When, on the other hand, a sequence of three consecutive signals is detected from sensor 103, the first ignition-effective cylinder may be cylinder 3 or 4, so that fuel is supplied to electroinjectors 116 relative to cylinders 3 and 4.

A further characteristic of the system according to the present invention is the simplified manner in which the amount of fuel injected, preliminary to stroke identification, is calculated by block 142 or 142', thus relieving the operating load on microprocessor 121, which, under such starting conditions, is already heavy enough, by virtue of having to process various parameters from various sensors, with no steady state reference data to go by. Finally, the starting fuel supply system according to the present invention guarantees that the fuel injected into the cylinders is sucked up by the same in substantially one respective induction stroke.

To those skilled in the art it will be clear that changes may be made to the starting fuel supply system according to the present invention and as described and illustrated herein, without, however, departing from the scope of the present invention.

For example, changes may be made, as required, to the steady state stroke reference at which fuel is supplied to electroinjectors 116. Microprocessor 121 may be designed to disable the FIG. 3 blocks relative to fuel injection preliminary to stroke identification, when the speed of engine 101 exceeds a given prearranged threshold, thus preventing unnecessary injection, e.g. in the event of stroke identification temporarily escaping control system 102, even with the engine already started. As preliminary injection is effected at relatively low speed, the former provision also ensures practically total fuel induction into the cylinder, even when fuel is injected roughly halfway through the induction stroke.

We claim:

1. A starting fuel supply system for an internal combustion engine (101), comprising an electronic injection system, characterized by the fact that said system comprises processing means (102) which, prior to stroke identification in said engine (101), cause fuel to be supplied to more than one injector (116), including the injector relative to that cylinder first reaching the ignition point subsequent to such identification, and which has already completed the induction stroke, thus enabling a substantially total intake of the fuel injected into said cylinder; further characterized by the fact that said processing means (102) comprise means (142, 142') for calculating the amount of fuel supplied to said injectors (116), prior to identification, by means of reduced parameters and in a simplified manner as compared with the calculation performed for subsequent sequential, timed supply of individual injectors (116); and further characterized by the fact that said parameters comprise only the cooling water temperature and the air pressure inside the induction manifold (107) of said engine (101).

2. A starting fuel supply system for an internal combustion engine (101), comprising an electronic injection system, characterized by the fact that said system comprises processing means (102) which, prior to stroke identification in said engine (101), cause fuel to be supplied to more than one injector (116), including the injector relative to that cylinder first reaching the ignition point subsequent to such identification, and which has already completed the induction stroke, thus enabling a substantially total intake of the fuel injected into said cylinder; further characterized by the fact that said processing means comprise means (140, 141, 148, 149, 145, 151) for detecting signals (S, C) from first sensor means (103) adapted to detect given angles of a drive shaft (125), and from second sensor means (105) adapted to detect given angles of a distributor (126) shaft, said detecting means (140, 141, 148, 145, 151, 149) controlling, as a function of said incoming signals (S, C), fuel supply to a given combination of said injectors (116).

3. A system as claimed in claim 2, characterised by the fact that, upon reception of a signal (C) from said second sensor means (105) or a sequence of signals (S) from said first sensor mens (103), said detecting means (140, 141, 148, 149, 145, 151) respectively control said fuel supply to a given first (4, 2) or a given second (4, 3) pair of said injectors (116).

4. A system as claimed in claim 3, characterised by the fact that said sequence comprises three consecutive signals (S) from said first sensor means (103).

5. A system as claimed in claim 2, characterised by the fact that said processing means (102) comprise means (142, 142') for calculating the amount of fuel supplied to said injectors (116), prior to identification, by means of reduced parameters and in simplified manner as compared with the calculation performed for subsequent sequential, timed supply of individual injectors (116).

6. A system as claimed in claim 2, characterized by fact that said processing means (145, 151) controlling fuel supply to said injectors (116), preliminary to identification of said engine strokes, disable subsequent fuel supply to the same injectors (116) until the respective cylinder has completed the induction stroke for sucking up substantially all of the injected fuel; and that, subsequent to identification of said engine strokes, said processing means (152) control sequential, timed fuel supply to said injectors (116) and enable ignition of said cylinders on said engine (101).

7. A system as claimed in claim 6, characterized by the fact that, subsequent to identification of said engine strokes, said processing means (152) control said sequential, timed fuel supply to said injectors (116) starting from an initial stroke reference value and working through stroke reference values tending progressively towards a steady state stroke reference value.

8. A system as claimed in claim 2, characterized by the fact that the amount of fuel supplied to said injectors (116), preliminary to identification of said engine (101) strokes, is received substantially entirely by the respective cylinder in one single induction stroke.

9. A system as claimed in claim 2, characterized by fact that said processing means (102) for said fuel supply, preliminary to identification of said engine (101) strokes, are enabled at an engine speed below a given preset engine speed.

* * * * *